March 10, 1931.                D. CRAIG                1,796,003
                    SELF LOADING AND UNLOADING VEHICLE
                    Filed April 12, 1929    2 Sheets-Sheet 1

Inventor
David Craig
by Wilkinson & Fiusta
Attorneys.

March 10, 1931. D. CRAIG 1,796,003
SELF LOADING AND UNLOADING VEHICLE
Filed April 12, 1929  2 Sheets-Sheet 2

Inventor
David Craig
by Wilkinson & Huxta
Attorneys.

Patented Mar. 10, 1931

1,796,003

UNITED STATES PATENT OFFICE

DAVID CRAIG, OF GATESIDE, BEITH, SCOTLAND

SELF LOADING AND UNLOADING VEHICLE

Application filed April 12, 1929, Serial No. 354,634, and in Great Britain May 1, 1928.

My invention relates to new or improved means of loading and unloading iron or steel rails, girders, timber, and such like into and out of suitable rail and road vehicles, and has among its objects to provide a machine of this character which is of a very simple, cheap and efficient construction, all as hereinafter described with reference to the drawings and pointed out in the claim.

In order that my invention may be properly understood and readily carried into effect, reference is had to the following detailed description taken in connection with the accompanying drawings, in which:—

Figure 5:
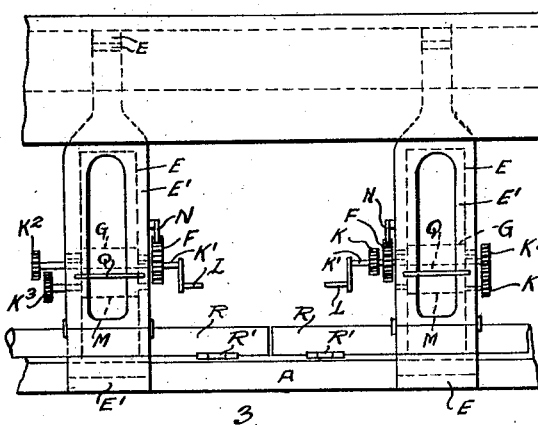
Figure 5 is a fragmentary enlarged rear view of the machine as illustrated in Figure 1.
Figure 1:
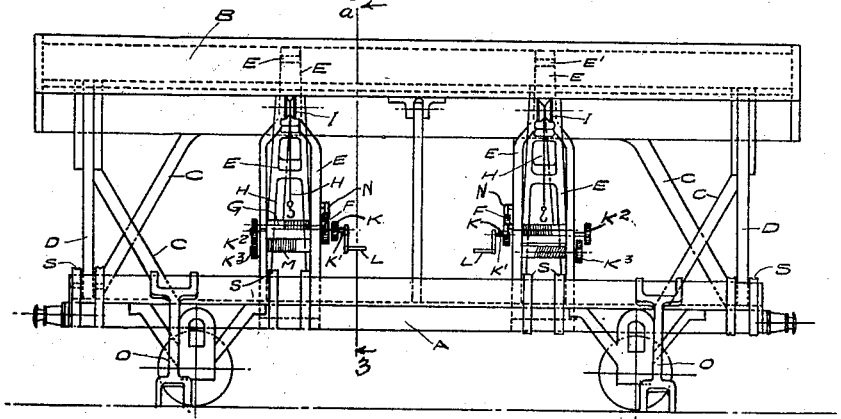
Figure 1 is a front elevation of a wagon illustrating my invention.
Figure 2:
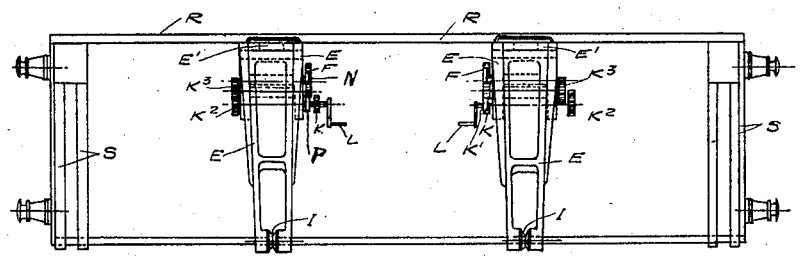
Figure 2 is a plan with the roof removed.
Figure 3:
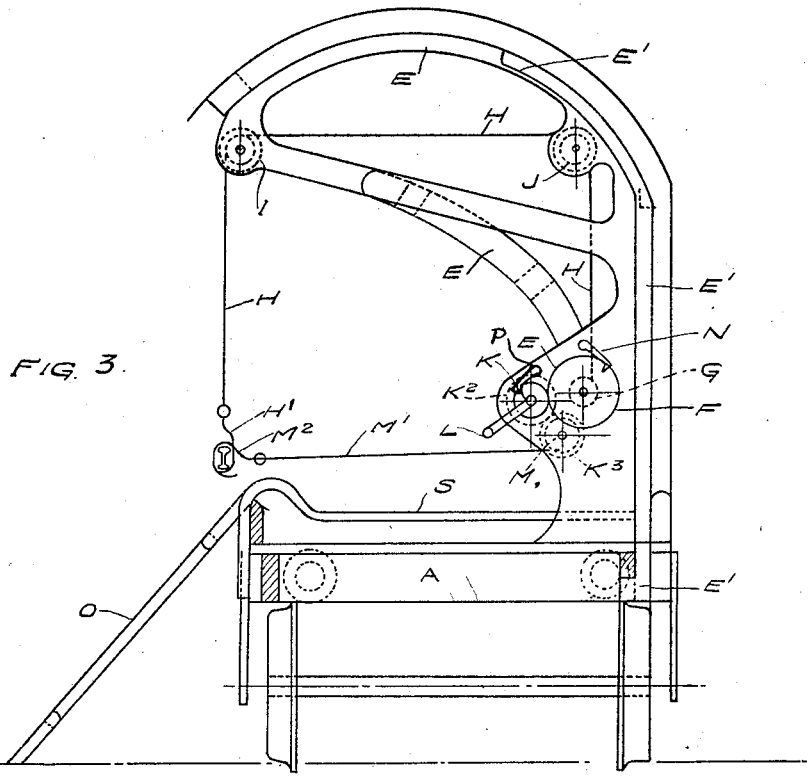
Figure 3 is an enlarged transverse section taken through the machine substantially on the line 3—3 of Figure 1.
Figure 4:
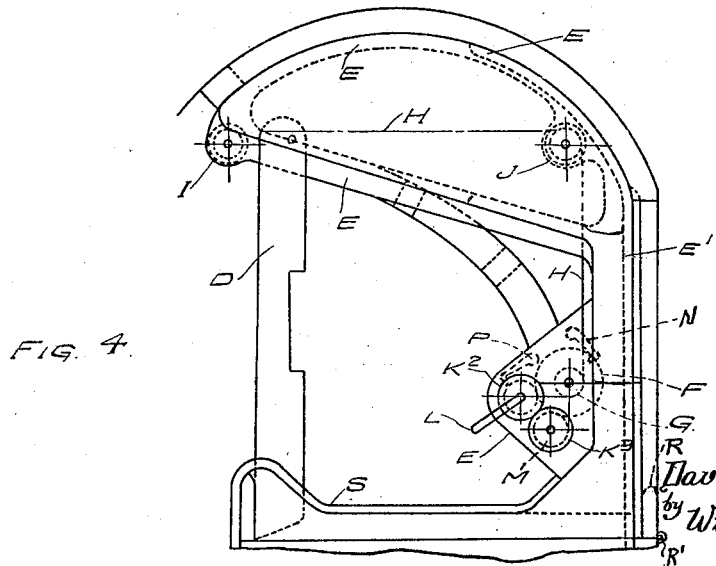
Figure 4 is a right end view of the machine as shown in Figure 1, the wheels and adjacent parts being broken away.

In carrying out this invention and referring to the drawings, A is the wagon or vehicle provided with a roof or cover B suitably carried on the supports C, detachable or other suitable supports D being also provided which may be swung out of the way when loading or unloading the wagon. I also provide a suitably shaped bracket or brackets E (in this case I have shown two), the base of each of which is securely fixed to the floor of the wagon A at the back side thereof. Suitably mounted on the lower end of the bracket E is a gear wheel F with a spindle or drum G connected thereto and to which spindle the usual lifting chain H or wire is attached, the outer end of which passes over pulleys J and I respectively spaced horizontally and transversely of the vehicle A and mounted on the upper part of the bracket E. This gear wheel F meshes with a small gear wheel K fixed to a spindle $K^1$ mounted in the bracket E in front of the drum G and which is normally operated by a hand-lever L connected thereto, said spindle $K^1$ being capable of moving longitudinally. The lower front portion of the bracket E is in the form of two sloping rests. Steel ways S are provided on the bottom of wagon A for the rails to rest on when loaded.

A pawl or dog N is pivoted to the side of each bracket E adjacent to the gear wheel F for engaging the teeth of the gear wheel F and preventing it from rotating when desired. Another pawl P is pivoted to the other side of each bracket E adjacent to a gear wheel $K^2$ mounted on the spindle $K^1$ and with which wheel the point of the pawl P is adapted to engage to prevent it from rotating when desired. The gear wheel $K^2$ is so positioned that when the gear wheel K is meshed with the gear wheel F, the gear wheel $K^2$ is free from all the gear wheels, but when the spindle $K^1$ is moved longitudinally, the gear wheel $K^2$ meshes with a gear wheel $K^3$ on the spindle of the winding drum M which carries a wire rope or chain $M^1$ for pulling in the lifted load. From the above it will be seen that the operating of the drums G and M is controlled by the position of the spindle $K^1$.

The rear edge of the bracket E is provided with a heavy plate or web $E^1$ securely fixed to the rear side of the wagon A, and the upper overhanging end of the bracket E extends slightly beyond the front side of the wagon A. The purpose of this plate E is to provide a back balance so that the wagon A will not topple over when lifting a heavy load.

Suitable hand rails Q are provided across the rear sides of the brackets for facilitating the mounting on the wagon A by the men operators. The rear side of the wagon A is provided with side boards R which may be suitably hinged at $R^1$ so that they may be swung down to form a step or platform.

In operation, when it is desired to load the vehicle A, the hook $H^1$ of the lifting chain or wire H and the hook $M^2$ of the chain or wire $M^1$ is suitably attached to the rail or other load to be lifted and the hand lever L first shifted to intermesh the gear wheels F and K and then operated to turn the drum G, wind the cable H thereon and raise the load. When the load has been raised sufficiently high, it is held in that position by means of the pawl N engaging with the gear wheel F. The lever L with its shaft $K^1$ is now shifted to release the gears F and K and to intermesh the gears $K^2$ and $K^3$ to connect the drum M with the handle L and the turning of the latter winds the cable $M^1$ on the drum and the load is then drawn into the vehicle A.

By alternately shifting the shaft $K^1$ back and forth, and by use of the locking pawls or dogs N and P, the cables H and $M^1$ are manipulated to shift the rail or other article into desired position on the vehicle and upon the ways S.

The vehicle A is shown in the present instance as in the form of a railway car, and the invention is disclosed as applied thereto for handling rails or the like. The front side of the vehicle A is adapted to be positioned toward the opposite track or to face toward the rails or other articles to be loaded upon the vehicle. In unloading the vehicle A, it is positioned to face toward the place or bed upon which the rails or the like are to be deposited. In handling rails the vehicle may be advanced along the track and operated to either unload rails at desired points, or to take up rails lying along the side of the track which are to be carried away.

In unloading, the reverse operation takes place and, when the load is lifted sufficiently high from the bottom of the vehicle it is lowered on to the ground.

In lifting rails from the up-service of the line, detachable skids O are provided by which old rails can be lifted and placed in the vehicle, and new rails removed from the vehicle and placed on the line.

As many brackets E with gearing as desired may be provided on the vehicle.

What is claimed is:

A self loading and unloading vehicle comprising a vehicle body, a plurality of brackets spaced apart along one side of the body and floor of the vehicle and curved into overhanging relation with the opposite front side of the body, a plurality of removable skids extending downwardly from the front side of the body to engage the ground and direct the load upwardly onto the upper surface of the vehicle, the skids being positioned so that the load may be directly deposited on the floor of the vehicle without further shifting of said skids, a pair of drums mounted on each bracket and having load engaging cables thereon, one of said cables extending upwardly through a bracket and downwardly from the overhanging portion thereof and the other cable extending outwardly across the vehicle body, a gear wheel on each drum, a pawl for each gear wheel for locking the drums from turning when desired, and a handle member having gear wheels thereon adapted to be alternately shifted to intermesh with the gear wheels of the drum for operating the same to raise and shift a load to the surface of the vehicle body.

DAVID CRAIG.